US010362453B2

(12) United States Patent
Jang

(10) Patent No.: US 10,362,453 B2
(45) Date of Patent: Jul. 23, 2019

(54) PTT COMMUNICATION METHOD AND APPARATUS THROUGH MULTIPLE PTT CHANNELS

(71) Applicant: Samsung Electronics Co., Ltd., Gyeonggi-do (KR)

(72) Inventor: Jong-Hyuk Jang, Gyeonggi-do (KR)

( * ) Notice: Subject to any disclaimer, the term of this patent is extended or adjusted under 35 U.S.C. 154(b) by 0 days.

(21) Appl. No.: 15/772,341

(22) PCT Filed: Oct. 28, 2016

(86) PCT No.: PCT/KR2016/012294
§ 371 (c)(1),
(2) Date: Apr. 30, 2018

(87) PCT Pub. No.: WO2017/074121
PCT Pub. Date: May 4, 2017

(65) Prior Publication Data
US 2018/0317056 A1 Nov. 1, 2018

(30) Foreign Application Priority Data
Oct. 30, 2015 (KR) ........................ 10-2015-0152384

(51) Int. Cl.
*H04W 4/10* (2009.01)
*H04W 4/18* (2009.01)
(Continued)

(52) U.S. Cl.
CPC .............. *H04W 4/10* (2013.01); *H04W 4/18* (2013.01); *H04W 68/10* (2013.01); *H04W 76/00* (2013.01);
(Continued)

(58) Field of Classification Search
None
See application file for complete search history.

(56) References Cited

U.S. PATENT DOCUMENTS

| 8,185,144 B1 | 5/2012 | Wick et al. |
| 2005/0143135 A1 | 6/2005 | Brems et al. |

(Continued)

OTHER PUBLICATIONS

PCT/ISA/210 Search Report issued on PCT/KR2016/012294 (pp. 3).
PCT/ISA/237 Written Opinion issued on PCT/KR2016/012294 (pp. 5).

*Primary Examiner* — Fayyaz Alam
(74) *Attorney, Agent, or Firm* — The Farrell Law Firm, P.C.

(57) ABSTRACT

The present disclosure proposes a method capable of, when a user simultaneously selects several PTT channels even in an apparatus not supporting a display, identifying the several PTT channels using alarm sounds for the PTT channels to transmit voices and distinguishing through which PTT channel a received voice is received, and a PTT terminal supporting the same. The present disclosure provides a push-to-talk (PTT) communication method, comprising: a step of connecting multiple PTT channels for communications between terminals; a step of storing history information representing received time of voice data through the multiple PTT channels; a step of selecting a PTT channel on the basis of the history information with respect to the multiple PTT channels, if an input of a PTT button is sensed; and a step of transmitting voice data to the selected PTT channel.

18 Claims, 5 Drawing Sheets

(51) Int. Cl.
    *H04W 76/00*     (2018.01)
    *H04W 88/02*     (2009.01)
    *H04W 68/10*     (2009.01)
    *H04W 76/15*     (2018.01)
    *H04W 72/04*     (2009.01)

(52) U.S. Cl.
    CPC ......... *H04W 88/02* (2013.01); *H04W 88/022* (2013.01); *H04W 72/0453* (2013.01); *H04W 76/15* (2018.02)

(56) References Cited

U.S. PATENT DOCUMENTS

| | | | |
|---|---|---|---|
| 2006/0040694 A1* | 2/2006 | Yoon | H04M 3/46 455/519 |
| 2007/0155415 A1* | 7/2007 | Sheehy | H04W 76/45 455/518 |
| 2007/0197248 A1 | 8/2007 | Reich et al. | |
| 2008/0037750 A1 | 2/2008 | Shaffer et al. | |
| 2008/0268792 A1* | 10/2008 | Munje | H04M 1/656 455/90.2 |
| 2009/0003558 A1 | 1/2009 | Katis et al. | |
| 2009/0259776 A1 | 10/2009 | Katis et al. | |
| 2009/0291646 A1* | 11/2009 | Ong | H04W 72/02 455/90.2 |
| 2009/0298487 A1 | 12/2009 | Przybysz et al. | |
| 2010/0009708 A1* | 1/2010 | Horio | H04W 76/45 455/518 |
| 2011/0026433 A1* | 2/2011 | Horio | H04L 65/4061 370/254 |
| 2012/0014295 A1* | 1/2012 | Yasuda | H04M 1/656 370/271 |
| 2012/0208588 A1 | 8/2012 | Blanco | |

\* cited by examiner

PTT COMMUNICATION METHOD AND APPARATUS THROUGH MULTIPLE PTT CHANNELS

PRIORITY

This application is a National Phase Entry of PCT International Application No. PCT/KR2016/012294, which was filed on Oct. 28, 2016, and claims priority to Korean Patent Application No. 10-2015-0152384, which was filed on Oct. 30, 2015, the contents of which are incorporated herein by reference.

TECHNICAL FIELD

The present disclosure relates to a method and apparatus for simultaneously supporting multiple PTT channels in Push-To-Talk (PTT) communication based on Internet Protocol (IP).

BACKGROUND ART

Traditional PTT communication starts at an analog two-way radio. Because of the limits of the corresponding technology, a user can select only one among multiple PTT channels (i.e. "analog frequency") and use the selected PTT channel. The user can listen to a voice input through the selected PTT channel or transmit a voice through the PTT channel. When the user changes the selected PTT channel, the user cannot receive or transmit a voice through the PTT channel before the change, any more.

However, when an IP technology instead of a technology using the analog frequency is applied to PTT communication, a user can simultaneously select multiple PTT channels supported by a PTT terminal and network. The user can receive or transmit a voice through the multiple PTT channels.

In the case where the user simultaneously selects multiple PTT channels, when voices are simultaneously received through the multiple PTT channels and the received voices are reproduced, it is difficult for the user to distinguish the respective PTT channels through which the reproduced voices are received. Moreover, when a user wants to transmit a voice through one PTT channel among multiple PTT channels, a method for selecting a PTT channel to be subject to transmission is needed.

In one example to solve the above, in preparation for the case where a user simultaneously selects multiple PTT channels, the multiple PTT channels may be previously divided into primary PTT channels (or a PTT channel having a relatively high priority) and non-primary PTT channels (or a PTT channel having a relatively low priority). When a voice received through a primary PTT channel is reproduced, even if a voice is received through a non-primary PTT channel, the voice received through the non-primary PTT channel is not reproduced. A PTT terminal notifies the user only the fact that the voice received through the non-primary PTT channel exists.

However, when a voice is received through the primary PTT channel in the course of reproduction of a voice received through the non-primary PTT channel, the PTT terminal stops reproducing the voice received through the non-primary PTT channel and reproduces the voice received through the primary PTT channel.

In the above example, when a voice is continuously received through the primary PTT channel, even if a voice is received through the non-primary PTT channel, the voice received through the non-primary PTT channel cannot be reproduced. In addition, even when voices are not simultaneously received through the primary PTT channel and the non-primary PTT channel, respectively, it is difficult for the user to distinguish between the two PTT channels without the aid of a display device configured to display the two PTT channels.

DETAILED DESCRIPTION OF THE INVENTION

Technical Problem

The present disclosure provides a method and apparatus by which a user can simultaneously use multiple PTT channels and transmit a voice through the multiple PTT channels while discriminating between the channels even in an apparatus which does not support a display.

Also, the present disclosure provides a method and apparatus for, when a voice is received through one among PTT channels, distinguishing through which PTT channel the voice is received.

Technical Solution

The present disclosure provides a Push-To-Talk (PTT) communication method including: connecting multiple PTT channels for communication between terminals; storing history information representing a time point at which voice data is received through the multiple PTT channels; when an input of a PTT button is sensed, selecting a PTT channel on the basis of the history information with respect to the multiple PTT channels; and transmitting voice data to the selected PTT channel.

The present disclosure provides a terminal using Push-To-Talk (PTT) communication, the terminal including a control unit configured to: connect multiple PTT channels for communication between terminals; store history information representing a time point at which voice data is received through the multiple PTT channels; and, when an input of a PTT button is sensed, select a PTT channel on the basis of the history information with respect to the multiple PTT channels, and a transmission/reception unit configured to transmit voice data to the selected PTT channel.

Advantageous Effects

According to the present disclosure, a PTT terminal can simultaneously use multiple PTT channels and transmit a voice through the multiple PTT channels while discriminating between the multiple PTT channels.

According to the present disclosure, a PTT terminal can simultaneously use multiple PTT channels and, when voices are received through the multiple PTT channels, distinguish the respective multiple PTT channels through which the voices are received, to reproduce the voices.

According to the present disclosure, when a PTT terminal simultaneously receives voices through multiple PTT channels, the PTT terminal can reproduce the respective voices without being overlapped.

Also, according to the present disclosure, multiple PTT channels are distinguishable from each other even in a PTT terminal not supporting a display.

MODE FOR CARRYING OUT THE INVENTION

Hereinafter, an embodiment of the present disclosure will be described in detail with reference to the accompanying drawings. In the following description of the present disclosure, a detailed description of known functions or configurations incorporated herein will be omitted when it may make the subject matter of the present disclosure unnecessarily unclear. The terms as described below are defined in consideration of the functions in the present disclosure, and the meaning of the terms may vary according to the intention of a user or operator, convention, or the like. Therefore, the definitions of the terms should be made based on the contents throughout the specification.

Hereinafter, a Push-To-Talk (PTT) terminal is an apparatus supporting PTT communication and may be a user equipment, a two-way radio, etc.

In the present disclosure, voice (or voice data) may be an example of a subject which a PTT terminal and a PTT server transmit and receive. However, data, etc. instead of voice may also correspond to the example.

The configuration of a general PTT system includes a PTT server and a PTT terminal.

When the PTT terminal makes a request of a right-to-talk (talk burst, i.e. a right to transmit voice) with respect to a particular PTT channel, to the PTT server, the PTT server may approve the request. The PTT server may transmit a voice received from the PTT terminal to a PTT terminal(s) existing in the particular PTT channel.

In one example, the PTT terminal may make a request for a talk burst to the PTT server through pressing a particular button. When the PTT server approves the request, the PTT terminal may transmit a voice to the PTT server. In addition, the PTT terminal may reproduce a voice transmitted by the PTT server.

Figure 1:
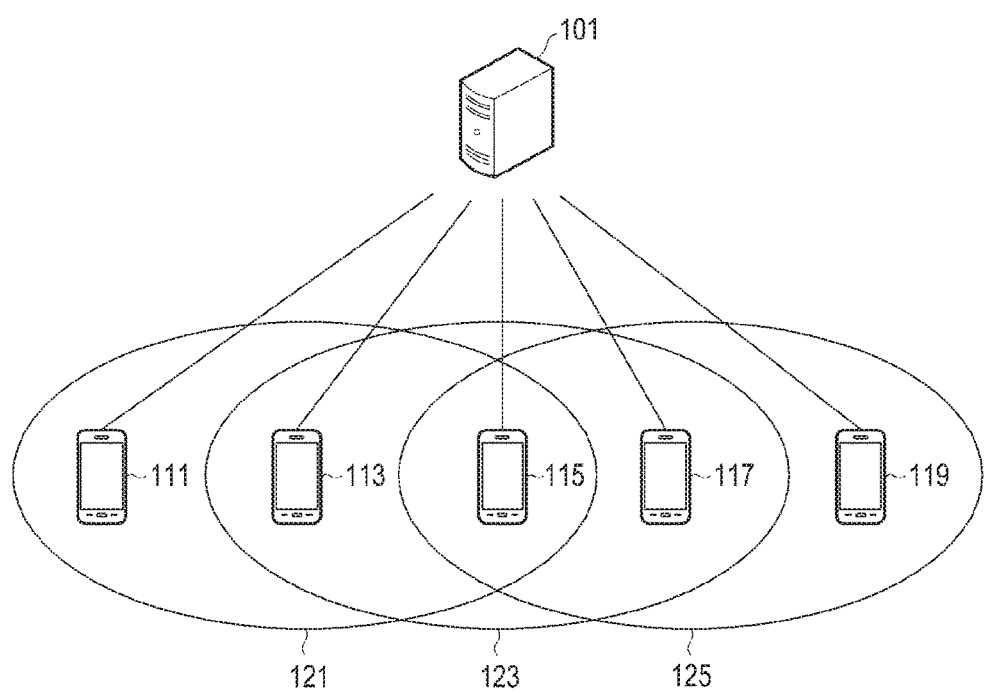
FIG. 1 is a diagram illustrating a configuration of a general PTT system.

FIG. 1 is a diagram illustrating a configuration of a general PTT system.

Referring to FIG. 1, a PTT system may include one PTT server 101 and multiple PTT terminals 111, 113, 115, 117, and 119. The multiple PTT terminals 111, 113, 115, 117, and 119 may be divided into a plurality of groups 121, 123, and 125.

A first group 121 may include three PTT terminals 111, 113, and 115 and use a PTT channel A. A second group 123 may include three PTT terminals 113, 115, and 117 and use a PTT channel B. Finally, the third group 125 may include three PTT terminals 115, 117, and 119 and use a PTT channel C.

The PTT terminal 113 may simultaneously belong to the first group and the second group. That is, a user using the PTT terminal 113 may simultaneously use two PTT channels.

The PTT terminal 115 may simultaneously belong to the first group, the second group, and the third group. That is, a user using the PTT terminal 115 may simultaneously use three PTT channels.

As described above, one PTT terminal may simultaneously use multiple PTT channels, and the configuration of PTT terminals included in each of PTT channels may vary.

The case where a PTT terminal simultaneously using multiple PTT channels receives a voice from a PTT server will be described with reference to FIGS. 2 and 3 in the present disclosure.

Figure 2:
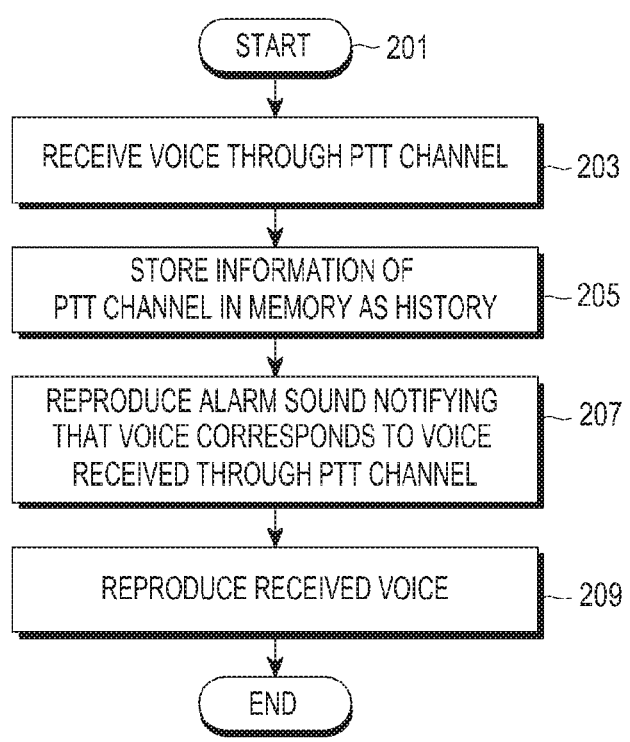
FIG. 2 is a flowchart illustrating a procedure in which a PTT terminal receives a voice from a PTT server and then processes the received voice according to an embodiment of the present disclosure.

FIG. 2 is a flowchart illustrating a procedure in which a PTT terminal receives a voice from a PTT server and then processes the received voice according to an embodiment of the present disclosure. The PTT terminal is on standby to receive a voice from the PTT server (201).

When the PTT server transmits a voice through a PTT channel, the PTT terminal may receive the voice (203).

The PTT terminal may firstly store information of the PTT channel in a memory as a history (205). Additionally, the PTT terminal may further store, in the memory, a time point at which the voice has been received through the PTT channel. The PTT terminal may sequentially or reversely arrange the information of the PTT channel according to a time point at which the voice is received, and then store the arranged information. The PTT terminal may separately store only information about the PTT channel.

The history may be stored as a part of the memory.

Before reproducing the received voice, the PTT terminal reproduces an alarm sound notifying that the voice to be reproduced corresponds to a voice received through the PTT channel (207). The alarm sound may be various kinds of beep sounds, or a Text To Speech (TTS) voice representing a channel name. The alarm sound may be previously configured by a user. In the PTT terminal, the alarm sound may be configured for each PTT channel according to a predetermined order. The PTT terminal may previously store multiple alarm sounds in the memory.

Then, the PTT terminal reproduces the received voice (209).

Alternatively, the PTT terminal may mix the alarm sound and the received voice and reproduce the mixed alarm sound and received voice. For example, the PTT terminal may mix the alarm sound and the received voice and reproduce the mixed alarm sound and received voice for a predetermined time interval from a start part of reproduction of the received voice.

Selectively, the PTT terminal may receive another voice through another PTT channel from the PTT server in the course of reproduction of the received voice.

When the another voice is received through the another PTT channel, the PTT terminal may store the information of the PTT channel, together with information of the another PTT channel received through the another PTT channel, as a history in the memory. The PTT terminal may temporarily store the another voice received through the another PTT channel in the memory to buffer the another voice.

Upon finishing the reproducing of the previously received voice, the PTT terminal may perform stages 207 and 209 in relation to the another voice received later.

Figure 3:
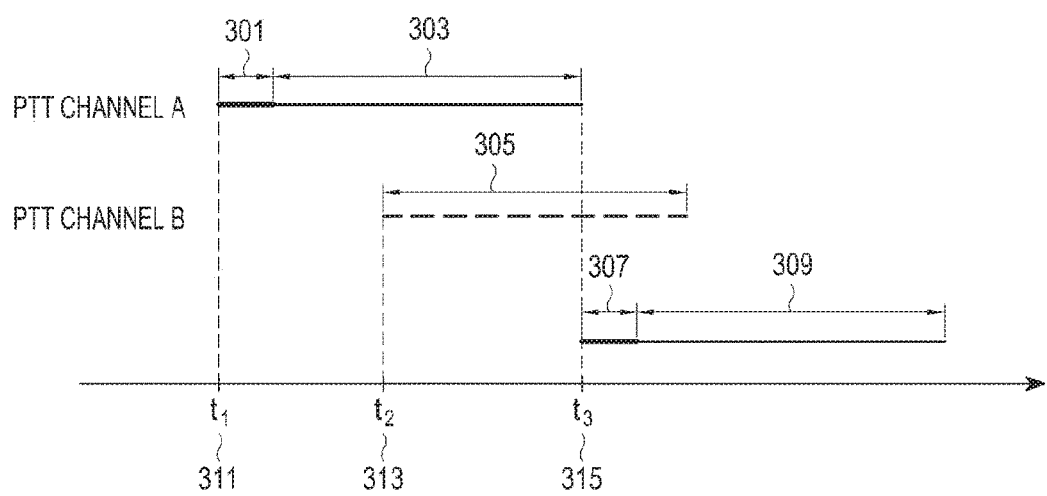
FIG. 3 is a diagram illustrating, on a time axis, a reception of a voice from a PTT server and a reproduction of the received voice by a PTT terminal, according to an embodiment of the present disclosure.

FIG. 3 is a diagram illustrating, on a time axis, a reception of a voice from a PTT server and a reproduction of the received voice by a PTT terminal, according to an embodiment of the present disclosure.

Referring to FIG. 3, a user of a PTT terminal may simultaneously use a PTT channel A and a PTT channel B. The PTT terminal may receive a voice through the PTT channel A at a particular time point of t1 311 or before the particular time point. Before the PTT terminal reproduces the voice having been received through the PTT channel A, the PTT terminal may firstly reproduce, during a 301 section, an alarm sound notifying through the PTT channel A. Then, the PTT terminal may reproduce the voice received through the PTT channel A during a 303 section.

The PTT terminal may receive a voice from the PTT channel B at a particular time point of t2 313 in the course of reproducing the voice received from the PTT channel A. Because the PTT terminal is reproducing the voice received from the PTT channel A, the PTT terminal may temporarily store the voice received during a 305 section from the PTT channel B in a memory.

When the PTT terminal finishes reproducing the voice received from the PTT channel A in the course of receiving a voice from the PTT channel B, the PTT terminal may reproduce, during a 309 section immediately after a time point of t3 315 at which the reproduction of the voice received from the PTT channel A is terminated, the voice that is received from the PTT channel B and stored in the memory. However, before the PTT terminal reproduces the voice received through the PTT channel B, the PTT terminal firstly reproduces an alarm sound notifying through the PTT channel B, during a 307 section. Because alarm sounds are different from each other depending on respective PTT channels, a user can distinguish through which PTT channel a voice to be reproduced soon is received.

Each section illustrated in FIG. 3 may be pre-configured or may be different according to the size of a received voice. The case where a voice is received in the course of reception of another voice is described in FIG. 3 as an example. However, a person skilled in the art can also apply the above example with no particular difficulty to the case where a voice is received after another voice has been received.

The case where a PTT terminal simultaneously using multiple PTT channels transmits a voice to a PTT server will be described with reference to FIGS. 4 and 5 in the present disclosure.

Figure 4:
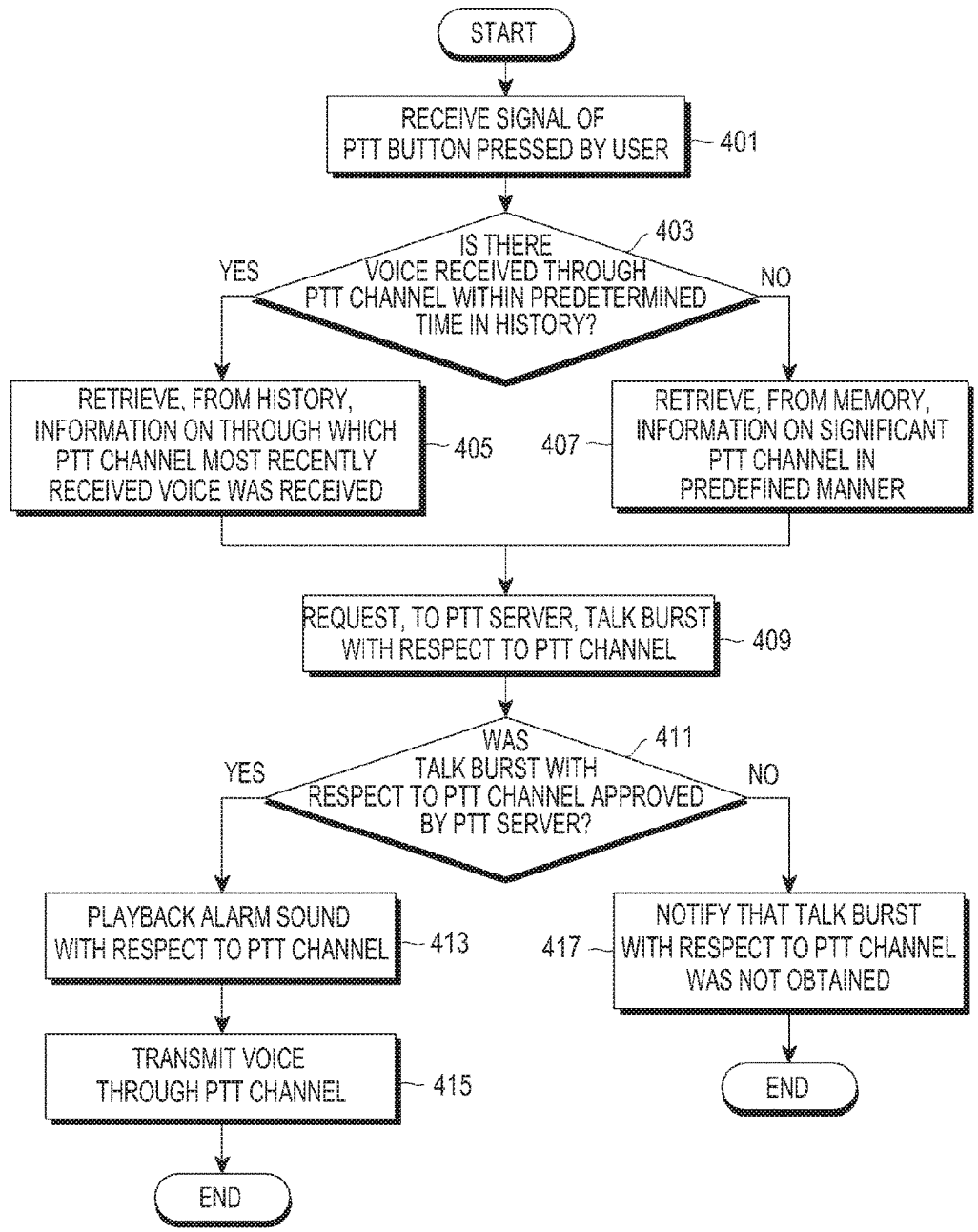
FIG. 4 is a flowchart illustrating a procedure in which a PTT terminal processes to transmit a voice to a PTT server according to an embodiment of the present disclosure.

FIG. 4 is a flowchart illustrating a procedure in which a PTT terminal processes to transmit a voice to a PTT server according to an embodiment of the present disclosure.

When a user pushes a PTT button to transmit a voice to a PTT server, the PTT terminal receives a signal of the PTT button (401).

The PTT terminal identifies whether there is a voice received through a PTT channel within a predetermined time interval in a history (403). Alternatively, the PTT terminal may identify whether there is a voice transmitted through a PTT channel within a predetermined time interval in a history. The predetermined time interval may be randomly determined by the PTT terminal and may be determined by a user.

When there is a voice received through a PTT channel within a predetermined time interval in the history, the PTT terminal brings, from the history, information about through which PTT channel a most recently received voice is received (405).

However, when there is no a voice received through a PTT channel within a predetermined time interval in the history, the PTT terminal brings, from a memory, information about a significant PTT channel by using a previously defined manner (407).

The PTT terminal that has brought information about a PTT channel in a stage 405 or 407 requests a talk burst on the PTT channel to the PTT server (409).

The PTT terminal identifies whether the PTT server approves the talk burst on the PTT channel (411).

When the PTT server approves the talk burst on the PTT channel, the PTT terminal reproduces an alarm sound for the PTT channel (413). Then, the user transmits a voice through the PTT channel (415).

However, when the PTT terminal does not obtain approval for the talk burst on the PTT channel from the PTT server, the PTT terminal notifies the user that the PTT terminal has not obtained the talk burst on the PTT channel (417).

Figure 5:
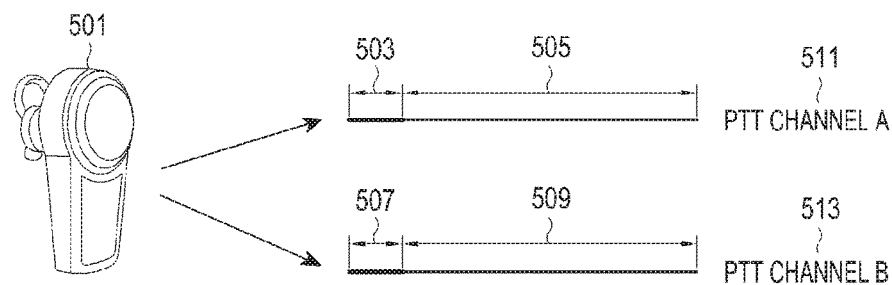
FIG. 5 is a diagram illustrating, on a time axis, a voice which a PTT terminal transmits to a PTT server according to an embodiment of the present disclosure.

FIG. 5 is a diagram illustrating, on a time axis, a voice which a PTT terminal transmits to a PTT server according to an embodiment of the present disclosure.

Referring to FIG. 5, a user of a PTT terminal may simultaneously use a PTT channel A 511 and a PTT channel B 513. The PTT terminal 501 is assumed to have a history in which the PTT terminal has most recently received a voice through the PTT channel A 511.

In one example, the user wants to transmit a voice through the PTT channel A 511. When a most recently received voice stored in a memory corresponds to a voice received through the PTT channel A 511, the user may select the PTT channel A 511 by pressing a PTT button of the PTT terminal one time.

The PTT terminal 501 requests a talk burst on the PTT channel A 511 to the PTT server.

When the PTT server gives permission for the talk burst on the PTT channel A 511 to the PTT terminal 501, the PTT terminal 501 reproduces an alarm sound for the PTT channel A 511 during a 503 section. The alarm sound notifies the user that the PTT terminal has obtained the talk burst on the PTT channel A 511.

Then, the user may transmit a voice through the PTT channel A 511 during a 505 section.

Alternately, the user may want to transmit a voice through the PTT channel B 513. When a most recently received voice stored in the memory corresponds to a voice that has been received through the PTT channel A 511, and a voice that has received before the most recently received voice corresponds to a voice that has been received through the PTT channel B 513, the user may select the PTT channel B 513 by pressing the PTT button of the PTT terminal twice.

Similarly, the PTT terminal 501 requests a talk burst on the PTT channel B 513 to the PTT server.

When the PTT server gives permission for the talk burst on the PTT channel B 513 to the PTT terminal 501, the PTT terminal 501 reproduces an alarm sound for the PTT channel B 513 during a 507 section. The alarm sound notifies the user that the PTT terminal has obtained the talk burst on the PTT channel B 513.

Then, the user may transmit a voice through the PTT channel B 513 during a 509 section.

Consequently, the user can use a PTT button of a PTT terminal to select a PTT channel through which a voice is to be transmitted. A PTT channel may be selected according to an order of a PTT channel through which a voice has been most recently received, or an order of a PTT channel through which a voice has been most recently transmitted.

When the PTT server permits a talk burst, the PTT terminal reproduces an alarm sound for a PTT channel on which the talk burst is permitted. The alarm sound allows the user to know through which PTT channel a voice is to be transmitted.

In the above description, the case where a user simultaneously uses two PTT channels is explained as an example. However, a person skilled in the art may also apply the above description to the case where three or more PTT channels are used.

Figure 6:
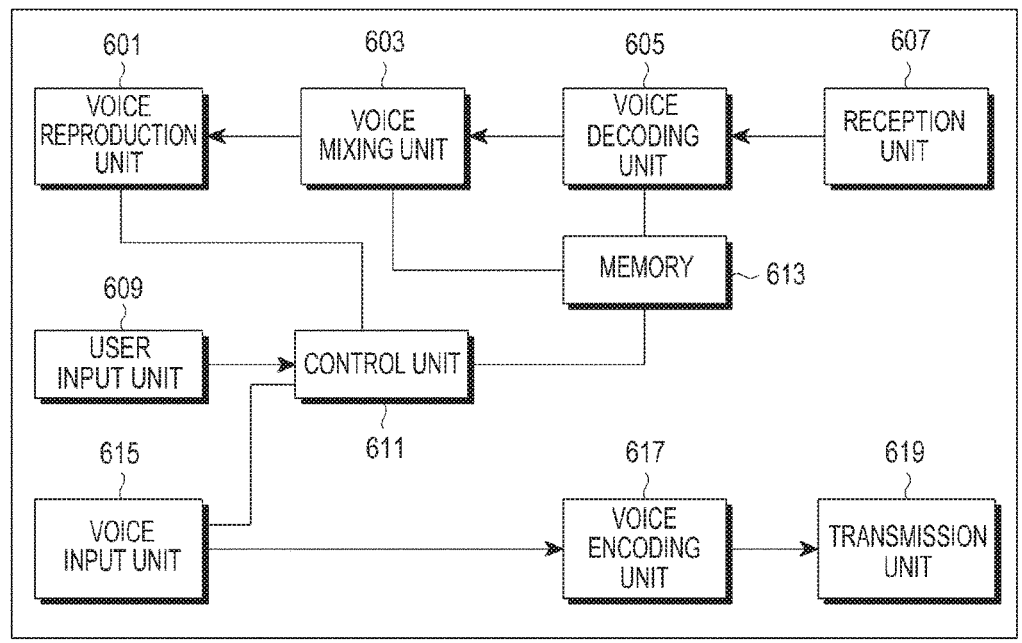
FIG. 6 is a diagram illustrating a configuration of a PTT terminal according to an embodiment of the present disclosure.

FIG. 6 is a diagram illustrating a configuration of a PTT terminal according to an embodiment of the present disclosure.

The PTT terminal may include a voice reproduction unit 601, a reception unit 607, a user input unit 609, a control unit 611, a memory 613, a voice input unit 615, a transmission unit 619, and the like.

The voice reproduction unit 601 may be a speaker, earphones, etc. which allow a user to hear a voice received from a PTT server. Also, the voice reproduction unit 601 may be configured by a separate device that is connected to the PTT terminal using Bluetooth communication, etc.

The reception unit 607 may receive a voice from the PTT server. Additionally, the reception unit 607 receives an event relating to whether another PTT terminal obtains a talk burst on a PTT channel.

The user input unit 609 may be, for example, a PTT button which a user press to transmit a voice to the PTT server. The user may classify PTT channels depending on the number of times the user presses the PTT button. When an input of the user is sensed, the user input unit 609 notifies the control unit 611 of the input.

The control unit 611 controls all elements of the PTT terminal.

The memory 613 is used for storing a time point at which a voice is received through a PTT channel, information about a PTT channel through which a voice has been received, information about a PTT channel through which a voice has been transmitted, multiple alarm sounds used for discriminating PTT channels from each other, etc. In addition, a voice received from the PTT server may be temporarily stored in the memory 613.

A voice to be transmitted through a PTT channel by the user is input to the voice input unit 615. For example, a microphone, etc. may correspond to the voice input unit 615. The voice input unit 615, like the voice reproduction unit 601, may be configured by a separate device connected to the PTT terminal as well.

The transmission unit 619 may transmit, to the PTT server, a voice input to the voice input unit 615, a request for a talk burst on a PTT channel, etc.

In addition, the PTT terminal may further include a voice mixing unit 603, a voice decoding unit 605, and a voice encoding unit 617.

The voice mixing unit 603 may mix a voice received from the PTT server and an audio clip (i.e. alarm sound) stored in the memory 613 into one voice stream.

The voice decoding unit 605 decodes a signal input from the reception unit 607.

The voice encoding unit 617 may compress a voice input to the voice input unit 615 by pre-processing and encoding the voice.

While the following operations are separately performed by a plurality of elements herein, all the following operations may be performed by one element as necessary.

For convenience of description, illustration and description for elements having no direct relation with the present disclosure have been omitted.

Meanwhile, the embodiments of the present disclosure disclosed in the present specification and the drawings have been presented to easily explain technical contents of the present disclosure and help with comprehension of the present disclosure, and do not limit the scope of the present disclosure. That is, it is obvious to those skilled in the art to which the present disclosure belongs that different modifications can be achieved based on the technical spirit of the present disclosure. Further, if necessary, the above respective embodiments may be employed in combination.

The invention claimed is:

1. A push-to-talk (PTT) communication method comprising:
   connecting, by a terminal, multiple PTT channels for communication with each of other terminals;
   storing, by the terminal, history information representing a time point at which data is received through each of the multiple PTT channels;
   when an input of a PTT button is sensed, selecting, by the terminal, a PTT channel from the multiple PTT channels based on the history information and the number of inputs of the PTT button; and
   transmitting, by the terminal, data through the selected PTT channel.

2. The method of claim 1, further comprising:
   requesting a talk burst on the selected PTT channel to a PTT server; and
   when the talk burst is approved by the PTT server, reproducing an alarm sound for the selected PTT channel.

3. The method of claim 1, wherein the selecting of the PTT channel based on the history information about the multiple PTT channels comprises selecting the PTT channel further using information about a PTT channel, stored in a memory other than the number of inputs of the PTT button.

4. The method of claim 3, wherein the information about the PTT channel, stored in the memory comprises information about a PTT channel used for transmission or reception in a predetermined time interval.

5. The method of claim 1, wherein the selecting of the PTT channel based on the history information about the multiple PTT channels comprises selecting the PTT channel using a pre-defined manner.

6. The method of claim 1, wherein the selecting of the PTT channel based on the history information about the multiple PTT channels comprises selecting the PTT channel in an order reverse to a time order of PTT channels used for recent receptions or transmissions based on the number of inputs of the PTT button.

7. A push-to-talk (PTT) communication method comprising:
   connecting, by a terminal, multiple PTT channels for communication with each of other terminals;
   receiving, by the terminal, data through the multiple PTT channels;
   storing, by the terminal, history information about the multiple PTT channels;
   reproducing, by the terminal, an alarm sound of a PTT channel through which data is received first among the multiple PTT channels;
   reproducing, by the terminal, the data of the PTT channel through which the data is received first;
   reproducing, by the terminal, an alarm sound of a PTT channel through which data is received later among the multiple PTT channels; and
   reproducing, by the terminal, the data of the PTT channel through which the data is received later, wherein the reproducing of the alarm sounds of the respective PTT channels comprises mixing the alarm sound notifying through the PTT channel, and the data and reproducing the mixed alarm sound and data.

8. The method of claim 7, wherein the alarm sound is pre-configured by a user or randomly configured.

9. The method of claim 7, wherein the alarm sound is a beep sound or a text-to-speech (TTS).

10. A terminal using push-to-talk (PTT) communication, the terminal comprising:
   a control unit configured to connect multiple PTT channels for communication with each of other terminals, store history information representing a time point at which data is received through each of the multiple PTT channels, and when an input of a PTT button is sensed, select a PTT channel from the multiple PTT channels based on the history information and the number of inputs of the PTT button; and
   a transmission/reception unit configured to transmit data to the selected PTT channel.

11. The terminal of claim 10, wherein a transmission/reception unit is configured to request a talk burst on the selected PTT channel to a PTT server, and
   wherein the control unit, when the talk is approved by the PTT server, is configured to reproducing an alarm sound for the selected PTT channel.

12. A terminal using push-to-talk (PTT) communication, the terminal comprising:
   a control unit configured to connect multiple PTT channels for communication with each of other terminals, store history information about the multiple PTT channels, reproduce an alarm sound of a PTT channel through which data is received first among the multiple PTT channels, reproduce the data of the PTT channel through which the data is received first, reproduce an alarm sound of a PTT channel through which data is received later among the multiple channels, and reproduce the data of the PTT channel through which the data is received later; and
   a transmission/reception unit configured to receive data through the multiple PTT channels,
   wherein the control unit configured to reproduce the alarm sounds of the respective PTT channels is configured to mix the alarm sound notifying through the PTT channel and the data and reproduce the mixed alarm sound and data.

13. The terminal of claim 10, wherein the control unit configured to select the PTT channel based on the history information about the multiple PTT channels is configured to select the PTT channel further using information about a PTT channel, stored in a memory other than the number of inputs of the PTT button.

14. The terminal of claim 13, wherein the information about the PTT channel, stored in the memory comprises information about a PIT channel used for transmission or reception in a predetermined time interval.

15. The terminal of claim 10, wherein the control unit configured to select the PTT channel based on the history information about the multiple PTT channels is configured to select the PTT channel using a pre-defined manner.

16. The terminal of claim 10, wherein the control unit configured to select the PTT channel based on the history information about the multiple PTT channels is configured to select the PTT channel in an order reverse to a time order of PTT channels used for recent receptions or transmissions based on the number of inputs of the PTT button.

17. The terminal of claim 12, wherein the alarm sound is pre-configured by a user or randomly configured.

18. The terminal of claim 12, wherein the alarm sound is a beep sound or a text-to-speech (TTS).

* * * * *